United States Patent [19]

Hamano

[11] Patent Number: 4,724,453
[45] Date of Patent: Feb. 9, 1988

[54] CAMERA INFORMATION TRANSMISSION SYSTEM

[76] Inventor: Hideo Hamano, C-524, Dai-2 Koporasu, Kibougaoka 144-1, Nakakibougaoka, Asahi-ku, Yokohama-shi, Kanagawa-ken, Japan

[21] Appl. No.: 934,022

[22] Filed: Nov. 24, 1986

[30] Foreign Application Priority Data

Nov. 25, 1985 [JP] Japan .................................. 60-262620

[51] Int. Cl.$^4$ ......................... G03B 7/091; G03B 7/16; G03B 7/20
[52] U.S. Cl. ............................... 354/289.12; 354/286; 354/410; 354/413
[58] Field of Search ................... 354/286, 289.12, 410, 354/413

[56] References Cited

U.S. PATENT DOCUMENTS 4,509,846 4/1985 Nakai et al. ................ 354/289.12 X
4,540,262 9/1985 Nakai et al. ................ 354/289.12 X Primary Examiner—Michael L. Gellner
Attorney, Agent, or Firm—Stiefel, Gross, Kurland & Pavane

[57] ABSTRACT

A microprocessor based camera information transmission system capable of electrically transmitting various information on a plurality of different camera accessories from the accessory (Y) to the camera body (X) with the accessory information being selectively provided to the camera body microprocessor (MCP) via a data input register (SR1) in response to the decoded clock output (SR2) from the microprocessor (MCP) for sequentially and serially providing a synchronized serial bit pattern to the microprocessor, (MCP) via the data input shift register (SR1) in accordance with a detected accessory identification code. The camera body (X) includes a flip-flop (FF) and counter (CO) which cooperate with the microprocessor clock to synchronize the serial bit pattern and to provide the corresponding identification code (S1-SN) from the accessory (Y) to the microprocessor (MCP) to set the quantity content of the microprocessor for that accessory (Y). The accessory (Y) includes a condition responsive gate array (ANI-ANn, OR2) for providing accessory information to the camera body (X) in response to a decoded clock output from the microprocessor (MCP) in accordance with the detected identification code.

7 Claims, 3 Drawing Figures

CAMERA INFORMATION TRANSMISSION SYSTEM

BACKGROUND OF THE INVENTION

1. Field of the Invention

The present invention relates to a system for transmitting information on camera accessories, such as an interchangeable lens or a stroboscopic flash device, to a camera body for use by a microprocessor in the camera body without the need for addressing, and particularly to such systems in which the accessory information to be transmitted may vary in content and quantity and is provided to the microprocessor in accordance with an identification code detected for each accessory.

2. Description of the Prior Art

Prior art camera information transmission system employing microprocessors in which memory elements such as a ROM are provided on the side of a camera accessory usable with the camera, such an interchangeable lens or stroboscopic flash, are well known, such as by way of example, the systems described in British Patent No. 1,552,597; U.S. Pat. Nos. 4,509,842; 4,477,164; and 4,560,267; and Japanese Patent Publication Nos. 54-108628 and 59-84228. In such prior art systems, various kinds of information on the camera accessories, such as those regarding an open diaphragm value, a focal length of an interchangeable lens, etc., for instance, are stored in the ROM and the various kinds of information stored therein are read on the side of the main body of a camera. Thus, these prior art systems employ an addressable read only memory or ROM located in the lens or accessory for storing the preset information to be sent to the microprocessor. In this type of system, a camera system has been used so far in which the quantities and contents of information transmitted from the camera accessories to the main body of the camera are defined, information on a given accessory is stored in memory elements such as the ROM in conformity with definitions, and the information on the accessory is read in conformity with the definitions of information on the side of the main body of the camera.

With a view to improving the functions of the main body of the camera and accessories thereof, the quantities of information to be transmitted from the accessories to the main body of the camera tend to increase. This increase in the quantities of information to be transmitted cannot be met by the aforesaid defined quantities, and therefore it becomes necessary to change the defined quantities. When the quantities and contents of the information to be transmitted are changed, however, in the prior art systems a problem occurs in that the camera cannot then normally be employed because of the impossibility of electric transmission of the changed quantity of information, even if accessories having new quantities of information can be fitted to the main body of the original camera. It is also impossible to employ accessories having the former quantities of information for the main body of a camera which reads new quantities of information. In other words, the change in the quantities and contents of information to be transmitted in prior art systems fails to preserve the interchangeability of the camera system, which brings forth a disadvantage to users. There is also a problem to manufacturers that the quantities of information on accessories are limited by the definitions of the quantities and contents of information to be transmitted, thereby depriving them of freedom in development of new products.

In addition to the aforementioned prior art ROM based systems, there have been prior art camera systems which employ simple switches to provide digital information to a microprocessor for use by the microprocessor, such as disclosed in U.S. Pat. Nos. 4,104,649; 4,426,147 and 3,428,858. However, these prior art systems, although not ROM based, still suffer from the same problems as discussed above when the quantities and contents of the information to be transmitted are changed. These disadvantages of the prior art are overcome by the present invention.

SUMMARY OF THE INVENTION

A microprocessor based camera information transmission system capable of electrically transmitting various information on a plurality of different camera accessories from the accessory (Y) to the camera body (X) with the accessory information being selectively provided to the camera body microprocessor (MCP) via a data input register (SR1) in response to the decoded clock output (SR2) from the microprocessor (MCP) for sequentially and serially providing a synchronized serial bit pattern to the microprocessor (MCP) via the data input shift register (SR1) in accordance with a detected accessory identification code. The camera body (X) includes a flip-flop (FF) and counter (CO) which cooperate with the microprocessor clock to synchronize the serial bit pattern and to provide the corresponding identification code (S1-SN) from the accessory (Y) to the microprocessor (MCP) to set the quantity content of the microprocessor for that accessory (Y). The accessory (Y) includes a condition responsive gate array (ANI-ANn, OR2) for providing accessory information to the camera body (X) in response to a decoded clock output from the microprocessor (MCP) in accordance with the detected identification code.

DETAILED DESCRIPTION OF THE INVENTION

Figure 1:
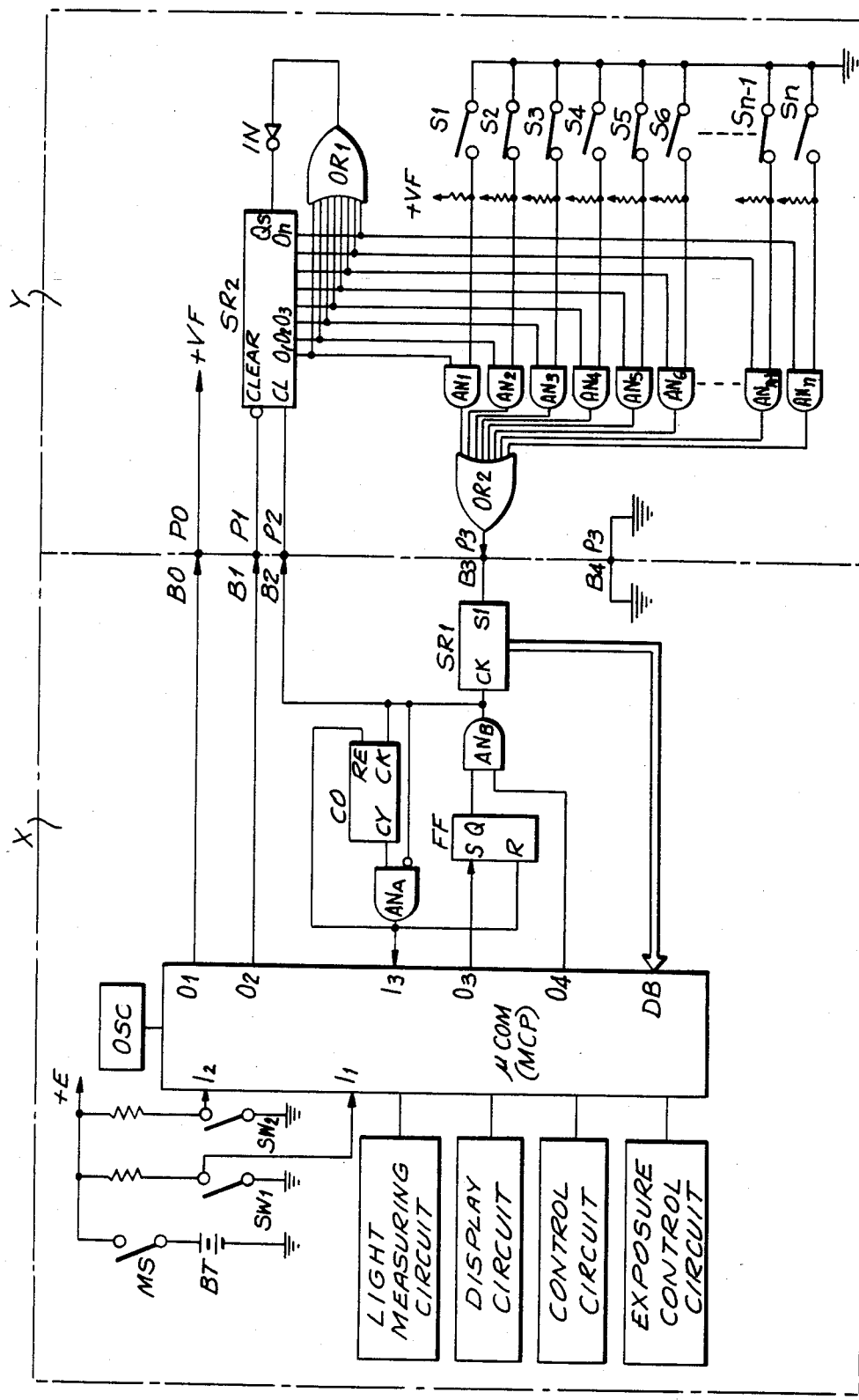
FIG. 1 is an illustrative simplified block diagram of a camera information transmission system in accordance with the present invention, employing an interchangeable lens as the accessory connected to the camera body by way of example.

Referring now to the drawings in detail, and initially to FIG. 1, a block diagram of a camera system to which the present invention is applied is shown. In FIG. 1, the main body X of a typical camera is shown on the left side of an alternating long and short dashed line, and an accessory Y with a presently preferred circuit arrangement is shown on the right side of the line. Reference numeral (BT) denotes a battery for supplying power to the camera, and (MS) denotes a power switch which is closed manually. When this power switch (MS) is closed, electricity is supplied from a power line (+E) to a conventional microprocessor or microcomputer (μcom) (MCP) and an oscillator (OSC), whereby an oscillating operation is started. Reference numeral (SW₁) which is connected in parallel to MS, is a photometric switch which is closed by a first-stage depression of a release button (not shown). When this switch (SW₁) is closed, a "LOW" signal is inputted to an input terminal ($I_1$) of the microprocessor (MCP). When the input terminal ($I_1$) turns "LOW", the microprocessor (MCP) makes an output terminal ($O_1$) "High" and supplies electricity to the circuit on the side of the accessory Y via terminals ($B_0$) and ($P_0$).

An output terminal ($O_2$) of the microprocessor (MCP) is connected to a reset terminal (CLEAR) of an input shift register ($SR_2$) on the side of the typical accessory Y through terminals ($B_1$) and ($P_1$). This output terminal ($O_2$) is "High" while information is transmitted from the accessory Y, and thereby the shift register ($SR_2$) is released from a reset state.

An output terminal ($O_3$) of the microprocessor (MCP) outputs a "High" signal as a serial data read signal. As a result, a flip-flop (FF) is set and an AND gate ($AN_B$), which has one input connected to the output of the flip-flop (FF), is opened, so that a clock pulse delivered from an output terminal ($O_4$) of the microprocessor (MCP) is given to the clock terminals (CK) of a 3-bit binary counter (CO) and an 8-bit data input shift register ($SR_1$). The output of AND gate ($AN_B$) is also connected in parallel to a clock input terminal (CL) of the shift register ($SR_2$) on the side of accessory Y through terminals ($B_2$) and ($P_2$).

The shift register ($SR_2$) on the side of accessory Y receives a "High" input signal at the reset terminal (CLEAR) and, thereby, is released from the reset state.

All of output terminals ($Q_1$) to ($Q_n$) of the shift register ($SR_2$) become "LOW", and a "High" signal is given to a serial input terminal ($Q_s$) through an OR gate ($OR_1$) and an inverter (IN). At the rise of the clock pulse given to the clock input terminal, a "High" signal is outputted to the output terminal ($Q_1$) of the shift register ($SR_2$). Then, the gate of an AND gate ($AN_1$) of a condition responsive gate array ($AN_1$–$AN_n$), in which the information set switch ($S_1$) is open, and the signal is inputted to the serial input terminal (SI) of the data input shift register ($SR_1$) on the side of the main body X of the camera via the output OR gate ($OR_2$) and terminals ($P_3$) and ($B_3$). A second clock is given to the clock terminal (CL) of the shift register ($SR_2$) on the side of the accessory Y, and thereby the output terminal ($Q_2$) turns "High". Since an information set switch ($S_2$) is closed, a "LOW" signal is outputted from AND gate ($AN_2$) of the gate array. Then, it is inputted to the serial input terminal (SI) of the data input shift register ($SR_1$) on the side of main body X of the camera via the output OR gate ($OR_2$) and the terminals ($P_3$) and ($B_3$). In this manner, in synchronization with the clock pulses, signals are transmitted bit by bit from the side of the accessory Y to the side of main body X of the camera.

At the fall of the clock pulse given to the clock terminal (CK), the data input shift register ($SR_1$) on the main body X side of the camera takes in information sequentially from the serial input terminal.

When an eighth clock pulse rises, the carry terminal (CY) of the counter (CO) turns "High", at the fall of this pulse. Thereby the counter (CO) and the flip-flop (FF) are reset, and simultaneously a serial data input set signal is turned "High" and given to an input terminal ($I_3$) of the microprocessor (MCP). Upon receiving the serial data input set signal, the microprocessor (MCP) fetches data from a data bus (DB).

Reference numeral (SW₂) denotes a release switch which is closed by a second-stage depression of the release button (not shown). When this switch (SW₂) is closed, a "LOW" signal is inputted to an input terminal ($I_2$) of the microprocessor (MCP). When the input terminal ($I_2$) turns "LOW", the microprocessor (MCP) executes a series of exposure control operations, and thus completes its operations.

Figure 2:
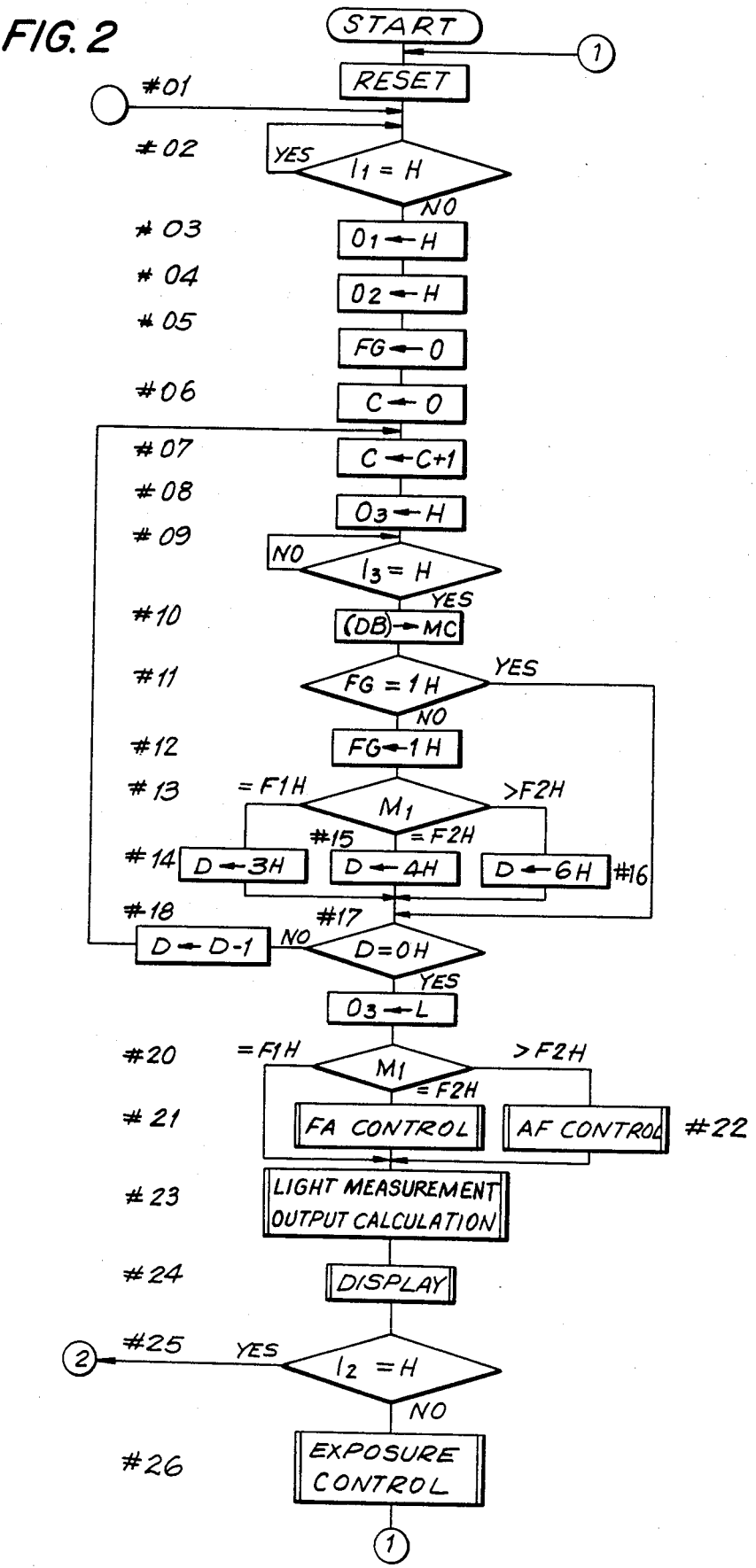
FIG. 2 is a typical flowchart illustrating the operation of the microprocessor in the embodiment of FIG. 1.

Referring now to FIG. 2, the flowchart showing the operations of the microprocessor (MCP) shall now be described. The following is a description of the operations of the system of FIG. 1, on the basis of this flowchart.

When the power switch (MS) is closed, electricity is supplied to the microprocessor (MCP) and the oscillator (OSC) so as for them to be reset. Thereafter, the photometric switch (SW₁) is closed at step #02 and an input of "LOW" to the input terminal ($I_1$) is waited for. When ($I_1$) turns "LOW", the output terminal ($O_1$) is made "High" at step #03, so as to supply electricity to the circuit on the side of the accessory Y. At step #04, the output terminal ($O_2$) is turned "High", so that the shift register ($SR_2$) on the accessory side will be released from a reset state and that an information identification check completion flag (FG) and a register C will be cleared. At step #07, 1 is added to the register C, a "High" signal is outputted as a serial data read signal from the output terminal ($O_3$) so as to start to read information on the accessory Y, and an input of "High" as a serial data input set signal from the input terminal ($I_3$) is waited for. When the serial data input set signal is received, a fetch is made from the data bus (DB) to a register (MC), and it is determined whether the information identification code check completion flag FG is "1H". When the flag FG is "1H", checking of information identification codes is already completed, and therefore an advance is made to step #17. When the flag FG is not "1H", an advance is made to step #12 for checking the information identification codes, and the flag FG is turned to be "1H" at this step. Next, at step #13, the information identification codes read in a register $M_1$ are discriminated, and "3H", "4H" or "6H" is set in a register D as the quantities of information read from various accessories, in accordance with the contents of the codes. Then, it is determined, at step #17, whether the register D shows "0H". When it does not show "0H", 1 is subtracted from the register D, a return is made thereafter to step #7, operations from step #7 to step #17 are repeated until the register D shows "0H", and thereby all the information can be read from the accessories. When the register D shows "0H", the serial data read signal output terminal ($O_3$) is set to be "LOW", and reading operations are thereby ended. In these operations, interchangeable lenses, each having the contents of information of a type A (Table 1), a type B (Table 2) or a type C (Table 3), are fitted to the main body of the camera. The contents of registers are shown in Table 4 as examples which are read in each register MC in conformity with the information identification codes.

TABLE 1

| Interchangeable Lens of Type A | |
|---|---|
| Set Switch | Set Contents of Information |
| $S_1$–$S_8$ | Information identification code (F1H) |
| $S_9$–$S_{16}$ | Open diaphragm value |
| $S_{17}$–$S_{24}$ | Minimum diaphragm value |

TABLE 1-continued

Interchangeable Lens of Type A

| Set Switch | Set Contents of Information |
|---|---|
| $S_{25}$–$S_{32}$ | Correction of open diaphragm F value |

TABLE 2

Interchangeable Lens of Type B

| Set Switch | Set Contents of Information |
|---|---|
| $S_1$–$S_8$ | Information identification code (F2H) |
| $S_9$–$S_{16}$ | Open diaphragm value |
| $S_{17}$–$S_{24}$ | Minimum diaphragm value |
| $S_{25}$–$S_{32}$ | Correction of open diaphragm F value |
| $S_{33}$–$S_{40}$ | Direction of letting-out of lens |

TABLE 3

Interchangeable Lens of Type C

| Set Switch | Set Contents of Information |
|---|---|
| $S_1$–$S_8$ | Information identification code (F3H) |
| $S_9$–$S_{16}$ | Open diaphragm value |
| $S_{17}$–$S_{24}$ | Minimum diaphragm value |
| $S_{25}$–$S_{32}$ | Correction of open diaphragm F value |
| $S_{33}$–$S_{40}$ | Direction of letting-out of lens |
| $S_{41}$–$S_{48}$ | Direction of rotation of AF coupler |
| $S_{49}$–$S_{46}$ | Coefficient of letting-out of AF |

TABLE 4

Contents of Information of Register M

| Register | Type A Contents of Information | Type B Contents of Information | Type C Contents of Information | Item of Information |
|---|---|---|---|---|
| $M_1$ | Information identification code (F1H) | Information identification code (F2H) | Information identification code (F3H) | Fundamental information |
| $M_2$ | Open diaphragm value | Open diaphragm value | Open diaphragm value | Fundamental information |
| $M_3$ | Minimum diaphragm value | Minimum diaphragm value | Minimum diaphragm value | Fundamental information |
| $M_4$ | Correction of open F value | Correction of open F value | Correction of open F value | Fundamental information |
| $M_5$ | | Direction of letting-out of lens | Direction of letting-out of lens | FA information |
| $M_6$ | | | Direction of rotation of AF coupler | AF information |
| $M_7$ | | | Coefficient of letting-out of AF | AF information |

Next, at step #20, and FA (focus aid) control is executed when an information identification code $M_1$ is "M 2H", while an AF (autofocus) control is executed when this code is "F 2H" or above, and an advance is made to operations of photometry, exposure and display. If the release switch (SW₂) is opened and "High" is inputted to the input terminal (I₂) at step #25, a return is made to step #2 and the operations from step #2 to step #25 are executed repeatedly. When the release switch, (SW₂) is closed and "LOW" is inputted to the input terminal (I₂), on the other hand, a subsequent exposure control is executed, and thereby all the processes of the camera system are ended. Then a return is made to step #1, and an advance is made to subsequent preparation of photographing.

TABLE 5

Functions of Main Bodies of Cameras Sorted by Types

| Functions of Main Body of Camera | Type A | Type B | Type C |
|---|---|---|---|
| Fundamental function | O | O | O |
| FA function | | O | O |
| AF function | | | O |

TABLE 6

Contents of Information on Interchangeable Lenses Sorted by Types

| Information on Interchangeable Lenses | Type A | Type B | Type C |
|---|---|---|---|
| Fundamental information | O | O | O |
| FA information | | O | O |
| AF information | | | O |

TABLE 7

Interchangeability of Main Bodies of Cameras and Interchangeable Lenses

| Main Body of Camera Type | Interchangeable Lens A | B | C |
|---|---|---|---|
| A | * | O | O |
| B | + | * | O |
| C | + | + | * |

In these tables, mark "*" denotes that all the functions of the main body of a camera and an interchangeable lens can be utilized;

mark "O" denotes that all functions of the main body of a camera can be utilized; and mark "+" denotes that the functions can be utilized within the scope of information on an interchangeable lens.

Next, a description will be made on the interchangeability of the main body of a camera and the accessories thereof to which the present invention is adapted.

Table 5 shows the functions of the main bodies of cameras sorted by types. The main body of a camera of the type A has only a fundamental function required for photographing, and that of the type B has the fundamental function and an FA function (manual focus adjustment or focus aid function). The main body of a camera of the type C is an example having the fundamental function, the FA function and an AF function (automatic focus adjustment function).

Table 6 shows interchangeable lenses of Tables 1 to 3 sorted by the information on the interchangeable lenses.

Table 7 shows the interchangeability obtained when the main body of a camera of each type shown in Table 5 is combined with the interchangeable lens of each type. Mark "*" represents a standard combination of the same types of which is obtained when the main body of a camera is purchased. It is needless to say that all the functions of the main body of the camera and the interchangeable lens can be utilized in this case.

Next, a description will be made on the interchangeability of the main bodies of cameras and interchangeable lenses which is obtained when a user of the main body of a camera of the type A and the interchangeable lens of the same type composing the standard combination purchases the main body of a camera of the type C and the interchangeable lens of the same type which are newly-developed articles. There are two kinds of combination. In the case of one kind of combination in which the interchangeable lens of the type C is fitted to the main body of the camera of the type A, the interchangeability represented by mark "O" is obtained, and all the functions (the fundamental function, in this case) of the main body of the camera can be utilized. In the case of the other kind of combination in which the interchangeable lens of the type A is fitted to the main body of the camera of the type C, the interchangeability represented by mark "+" is obtained, and the main body of the camera can be operated within the scope of information on the interchangeable lens (i.e., with fundamental function in this case, since the information is limited to fundamental ones).

Figure 3:
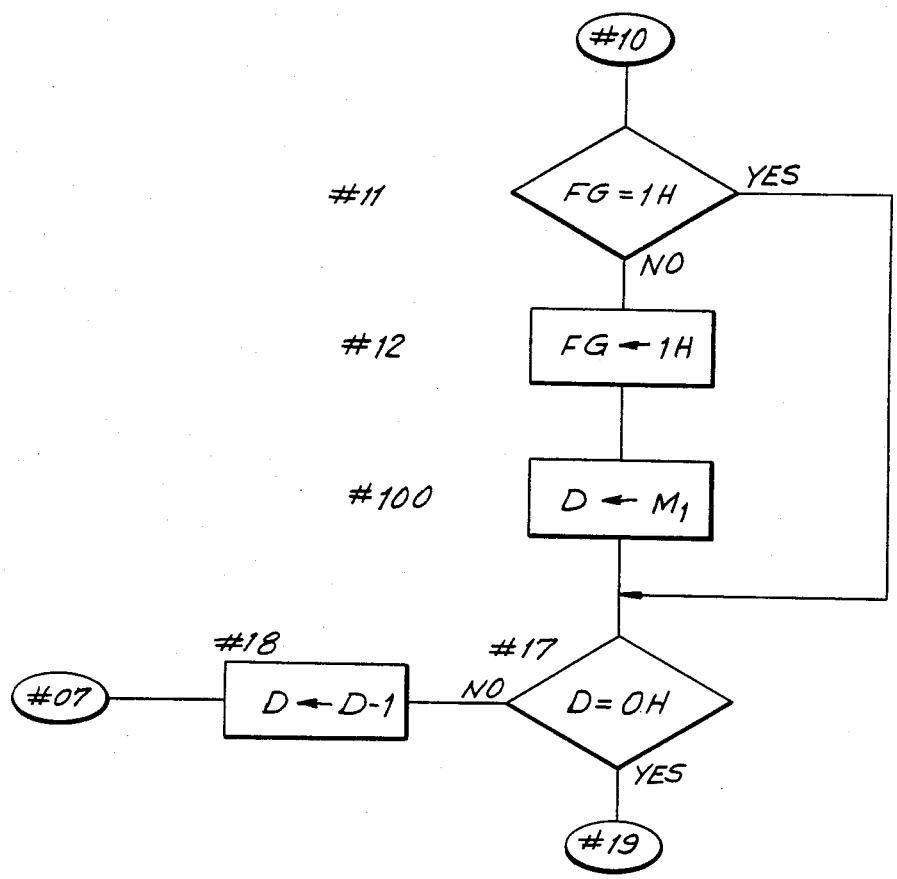
FIG. 3 is another flowchart, similar to FIG. 2, illustrating an alternative embodiment of the microprocessor operating program in accordance with the present invention.

Referring now to FIG. 3, FIG. 3 is a flowchart showing another embodiment of the operation program shown in FIG. 2. FIG. 3 shows only the components which are different from those in FIG. 2. At step #13 in FIG. 2, information identification codes read in the register $M_1$ are discriminated, and the quantities of information read from accessories are set in the register D in accordance with the contents of the codes. In the present embodiment, the information identification codes themselves are made to be the quantities of information read from the accessories. In FIG. 3, it is determined whether the information quantity set completion flag FG is "1H". When the flag FG is "1H", information is already set, and therefore an advance is made to step #17. When the flag FG is not "1H", an advance is made to the information quantity set step #12, so as to turn the flag FG to be "1H".

Next, at step #100, the quantities of information read from the accessories are set in the register D. Then, it is determined at step #17 whether the register D shows "OH". When the register D does not show "OH", 1 is subtracted from this register, a return is made to step #7, the operations from step #7 to step #17 are repeated until the register D shows "OH", and thus all the information can be read from the accessories.

According to the present invention, information identification codes for identifying the quantities and contents of information are provided on the side of camera accessories, information set in conformity with the information identification codes is outputted sequentially and serially bit by bit, and the information on the accessories is transmitted sequentially by read means which are provided on the side of the main body of a camera and selected in accordance with the aforesaid information identification codes. Therefore, the interchangeability of a camera system can be preserved even when the quantities and contents of information transmitted from the accessories to the main body of a camera are changed, and this produces an effect that the common use of accessories is made possible for a user who has a plurality of main bodies of cameras different in types. Moreover, former accessories can be utilized, though with some limitations, when a new main body of a camera is purchased instead of a former one, and this is effective for the reduction of the cost required for the purchase. In addition, the usual limitations to the quantities of information on accessories, which are set by the definitions of the quantities and contents of information to be transmitted, are removed, and this brings to manufacturers an effect that freedom in development of new products is increased.

What is claimed is:

1. A microprocessor based camera information transmission system capable of electrically transmitting various information on a plurality of different camera accessories from the camera accessories to the camera body with which said accessories are usable for controlling the operation of the camera in conjunction with a given one of said accessories, said plurality of different accessories comprising accessory information which is different in content and quantity for different camera accessories in said plurality, each of said accessories comprising means for transmitting an information identification code to said camera body for identifying the content and quantity of accessory information corresponding thereto and means for sequentially and serially providing said identified accessory information to said camera body, said camera body comprising a microprocessor comprising data register means and means for detecting said identification code, said transmitted accessory information comprising preset information electrically transmitted to said microprocessor in accordance with said detected identification code, said means for detecting said identification code comprising flip flop means connected to a serial data read output of said microprocessor for being set thereby, said flip flop providing one input to an AND gate whose output comprises a clock signal for said corresponding accessory and for a data input register in said camera body, said data input register being capable of receiving said accessory information and said identification code from said corresponding accessory when said accessory is electrically connected to said camera body, said AND gate having another input connected to a clock signal output of said microprocessor, said data input register being connected to a data bus input to said microprocessor, the setting of said flip flop causing a fetch to be made from said data bus input to said microprocessor for detecting said identification code of said corresponding accessory provided to said data input shift register, said detected identification code setting the quantity content of said microprocessor data register means for said corresponding accessory, said corresponding accessory comprising a condition responsive output gate array and an input shift register decoder means, said input shift register decoder means being electrically connected to said AND gate clock output and said output gate array being connected between said input shift register decoder means output and said data input register input for selectively providing said accessory information thereto in response to said decoder clock output for sequentially and serially providing a synchronized serial bit pattern to said microprocessor in accordance with said detected accessory identification code.

2. A camera information transmission system in accordance with claim 1 wherein said corresponding accessory is an interchangeable lens.

3. A camera information transmission system in accordance with claim 1 wherein said corresponding accessory further comprises a preset switch array connected to one input of said condition responsive gate array, said input shift register decoder means output being connected to another input of said condition responsive gate array, said preset switch array comprising said accessory identification code.

4. A camera information transmission system in accordance with claim 2 wherein said condition responsive gate array comprises a plurality of AND gates whose inputs comprise said one input and said other input of said gate array, the outputs of said AND gates being connected to the inputs to an output OR gate whose output is electrically connectable to said data input register input for providing said accessory information thereto.

5. A camera information transmission system in accordance with claim 1 wherein said condition responsive gate array comprises a plurality of AND gates the outputs of said AND gates being connected to the inputs to an output OR gate whose output is electrically connectable to said data input register input for providing said accessory information thereto.

6. A camera information transmission system in accordance with claim 1 wherein said camera body further comprises an eight bit counter operatively connected between said AND gate clock output and the reset input of said flip flop for resetting said flip flop every eight clock pulses for providing a data word to said microprocessor.

7. A camera information transmission system in accordance with claim 1 wherein said accessory is a stroboscopic flash.

* * * * *